United States Patent [19]
Halstead

[11] Patent Number: 6,049,290
[45] Date of Patent: Apr. 11, 2000

[54] CONTROL BUTTON INTERFACE FOR A PORTABLE COMMUNICATIONS DEVICE

[75] Inventor: Whitfield G. Halstead, Los Altos, Calif.

[73] Assignee: Wireless Access, Santa Clara, Calif.

[21] Appl. No.: 08/874,824

[22] Filed: Jun. 13, 1997

[51] Int. Cl.[7] ........................................................ H04B 1/38

[52] U.S. Cl. .............................. 340/825.44; 340/825.56; 455/38.1; 455/38.4; 455/344; 455/347; 361/752; 361/814

[58] Field of Search ......................... 340/825.44, 825.56; 455/38.1, 38.4, 344, 347; 361/752, 814; 400/98, 100, 489; 341/22; 200/5 R, 5 E, 329, 330, 331, 343

[56] References Cited

U.S. PATENT DOCUMENTS

| | | | |
|---|---|---|---|
| D. 338,059 | 8/1993 | Halstead et al. | D14/191 |
| 5,175,873 | 12/1992 | Goldenberg et al. | 455/347 |
| 5,523,531 | 6/1996 | Ozaki | 455/347 |

*Primary Examiner*—Michael Horabik
*Assistant Examiner*—Yves Dalencourt
*Attorney, Agent, or Firm*—Blakely, Sokoloff, Taylor & Zafman LLP

[57] ABSTRACT

A pager including a housing and a control button interface, where the housing has an opening having at least one recess area around a portion of the opening and the control button interface is coupled to the housing and has multiple buttons arranged with at least one of the controlled buttons positioned between the other buttons. One of the buttons is located near the one recess area so as to enable its depression without causing other buttons from being depressed.

14 Claims, 4 Drawing Sheets

CONTROL BUTTON INTERFACE FOR A PORTABLE COMMUNICATIONS DEVICE

FIELD OF THE INVENTION

The present invention relates to the field of a portable communications device such as, for example, pagers; more particularly, the present invention relates to a control button interface for a portable communications device where the space for the control button interface is small and the housing surrounding the interface includes relief areas to increase the area for accessing one or more of the buttons.

BACKGROUND OF THE INVENTION

Today, pagers, and the paging systems in which they operate, are quite prevalent in society. They are no longer used simply to send phone numbers to return calls, but also are used to receive information on stock quotes and other financial information, sport scores, calendar updates, as well as a whole host of other information which individuals desire on a timely basis.

Until recently, paging systems were limited to one way paging. That is, an individual using a paging system was limited to having information sent from a paging broadcast center to an individual's pager, which may reside anywhere within the broadcast area of the paging system. Today, two-way paging systems have been introduced. In a two-way paging system, an individual using a pager may send messages, as well as receive them. A two-way pager includes an input device for message creation.

The emergence of two-way paging systems has brought about a conflict between the need to maintain the portable pager as a small form factor communications device while providing the pager with functionality to create messages to be sent. Problems may arise where the input device includes buttons that are positioned close together. In such a case, pressing one of the buttons may cause another button to be depressed. However, if the buttons are positioned far apart, the size of the pager may have to be increased. What is desired is to have the buttons on the interface be positioned close together to reduce the amount of area allotted to the interface on the pager.

Thus, what is needed is an interface for a portable paging device that allows the paging device to maintain a small form factor yet provide an input device which is easy to use by the user yet which has buttons that don't interfere with each other.

SUMMARY OF THE INVENTION

A pager is described. The pager comprises a housing and a control button interface. The housing has an opening having at least one recess area around a portion of the opening. The control button interface is coupled to the housing and has multiple buttons which are flush with the housing surface. One of the buttons is located near the one recess area so as to enable its depression without causing other buttons from being depressed.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A control button interface for a communications device, such as a pager, is described. In the following description, numerous details are set forth, such as numbers of switches, component types, etc. It will be apparent, however, to one skilled in the art, that the present invention may be practiced without these specific details. In other instances, well-known structures and devices are shown in block diagram form, rather than in detail, in order to avoid obscuring the present invention.

Overview

The pager of the present invention includes a housing and a control button interface. The housing has an opening having at least one recessed relief area around a portion of the opening. These relief areas are areas in the housing which enable a finger or other object used in depressing a particular control button to freely pass the surface of the remainder of the surrounding housing for ease of use and to prevent the housing from interfering with continued depression with one or more buttons in the control button interface after depression of the button, in full or at least in part, has started. One skilled in the art would be able to determine a suitable amount of area to allow continued depression based on proximity of other control buttons and the allowable space for accessing each button. For instance, such an area may be approximately 0.030 inches or some other comparable distance.

The control button interface is coupled (e.g., mounted) to the housing has multiple buttons arranged with at least one of the buttons positioned between the other buttons. One of the buttons is located near the one recessed relief area so as to enable its depression without causing other buttons in the plurality of buttons from being depressed. The relief areas expand the effective button area. In other words, the size of the contact area is expanded. As discussed in more detail below, the relief areas are sized so as to enable the button to move through the full switch travel area (the distance of the switch from a non-depressed state to a depressed, contact producing state). The recessed relief area may be larger; however, in the interest of maintaining smaller form factors, it is preferred that the relief area be at least the switch travel area.

In one embodiment, each of the buttons is flush with the surface of the housing when not being depressed. Thus, the relief areas improve performance while keeping the button surface flush with the surrounding surface.

Figure 1A:
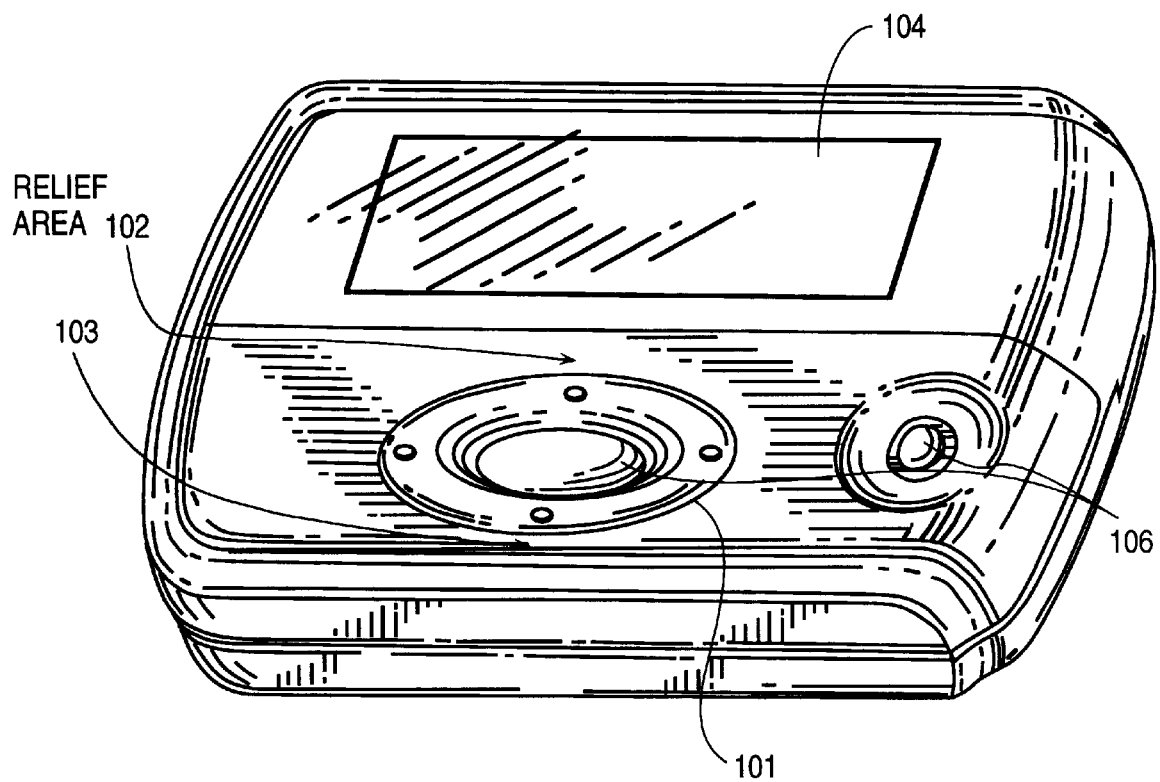
FIG. 1A illustrates a perspective view of one embodiment of the paging device of the present invention.

FIG. 1A illustrates a perspective view of one embodiment of the paging device of the present invention. Referring to FIG. 1A, the cover of a pager includes relief areas 102 and 103, message display area 104, control button interface in openings 101 and 106. Message display area 104 displays messages in a manner well-known in the art. Such messages includes both received and created messages.

Figure 1B:
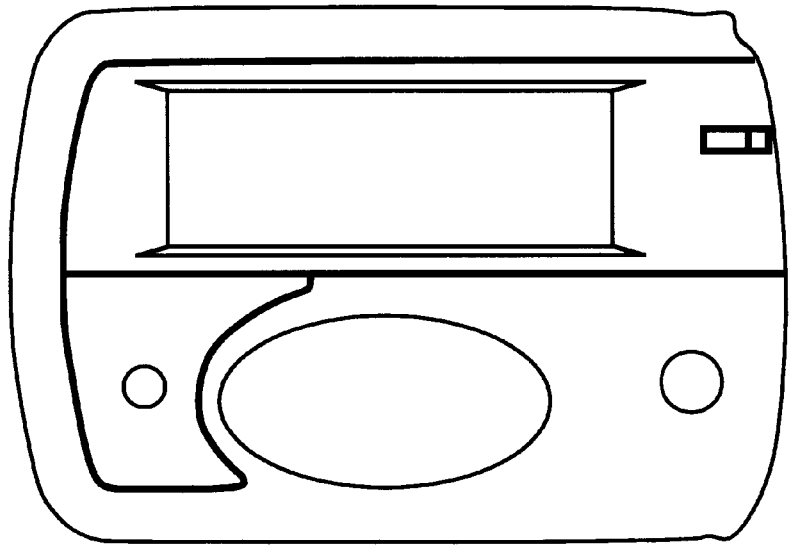
FIGS. 1B–1D illustrate views of the paging device of FIG. 1A.
Figure 1C:
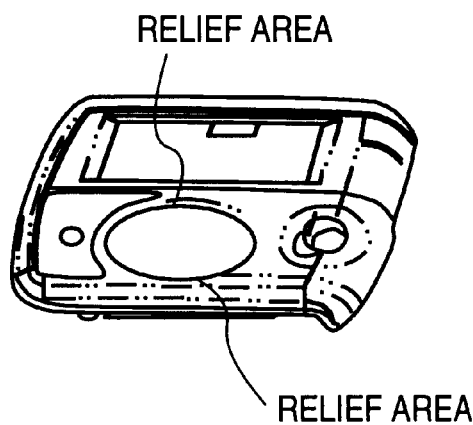
Figure 1D:
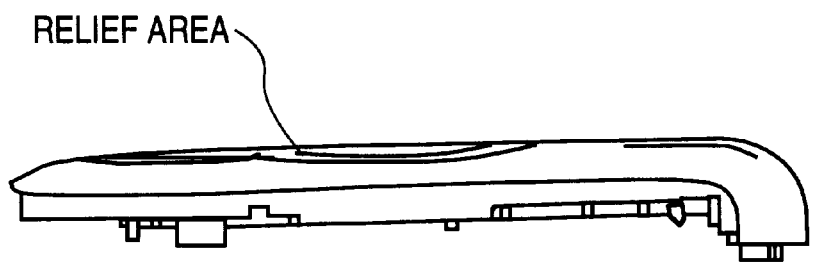

FIGS. 1B–1D illustrate views of the paging device of FIG. 1A illustrating alternative views of the pager in FIG. 1A.

Figure 2:
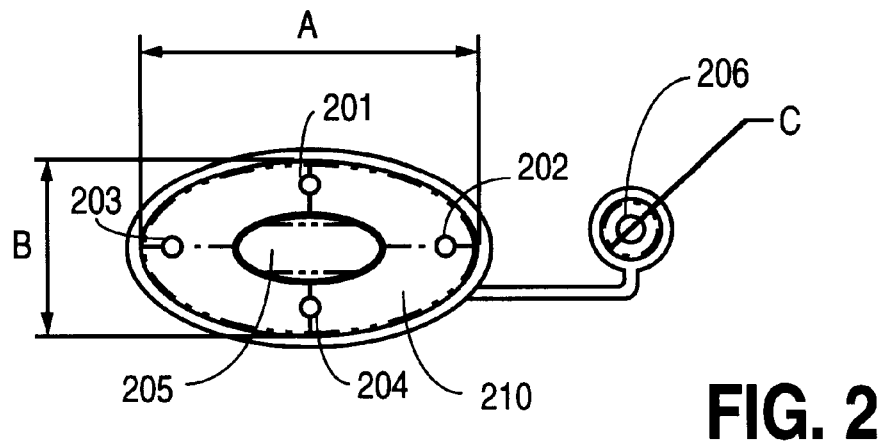
FIG. 2 illustrates a top view of the control button interface.

FIG. 2 illustrates one embodiment of the touch pad interface of the present invention. Referring to FIG. 2, a control button interface comprises six control buttons, control buttons 201–206. Control buttons 201–204 are up, down, left and right navigation control buttons, respectively. Control button 205 comprises an enter control button to signal accepted input selections to the pager. In one embodiment, control button 206 is an exit or escape control button.

In one embodiment, the control buttons are implemented as a single pad 210 coupled to and overlaying a set of discrete switches. In one embodiment, pad 210 comprises a flexible material, such as rubber (e.g., silicon rubber, neoprene, etc.) or thermoplastic elastomer. In an alternative embodiment, pad 210 is not flexible. In alternative embodiment, separate covers or pads could be positioned over each of the individual control buttons or switches or over subsets of them.

In one embodiment, control button 205 is centered between control buttons 201–204. Also, control buttons 201 and 204 are closer to control button 205 than that of control buttons 203 and 202. In fact, control buttons 201 and 204 are close enough to control button 205 that relief areas above and below the surface of buttons 201 and 204, respectively, are included in the top cover to provide a larger surface area to enable depression of those control buttons by a finger, for instance, without depression of the button 205 (or any of the other buttons).

Note that in an alternative embodiment, the control button is positioned between a control button, such as a button 205, does not have to be included between the other control buttons; however, the recess areas may still be necessary if control buttons 201 and 204 are placed in close proximity to each other. In such a case, the relief areas allow one of the buttons to be depressed without causing the other to be depressed. Also note that in an alternative embodiment, control buttons 202 and 203 may be positioned closer to each other instead of the top and bottom control buttons 201 and 204.

Figure 3:
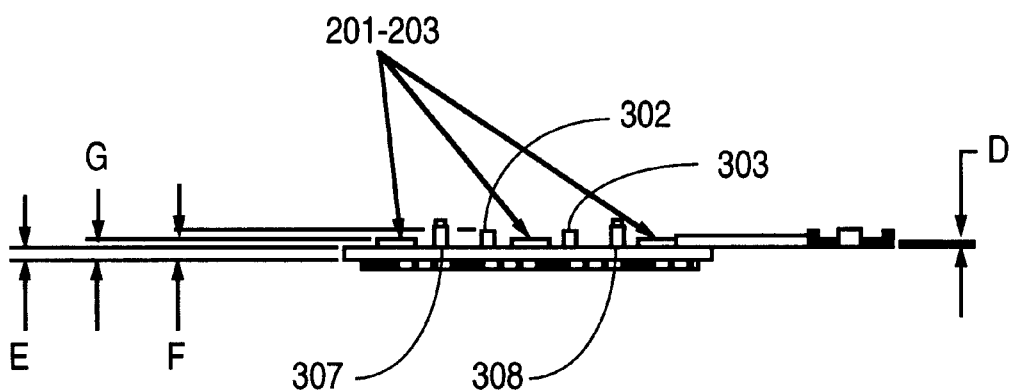
FIG. 3 illustrates a side view of the interface shown in FIG. 2.
Figure 4:
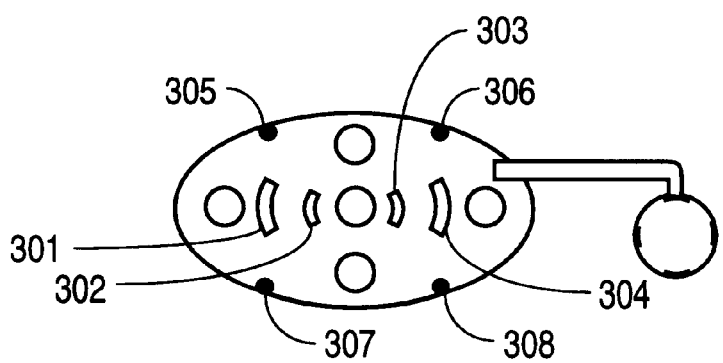
FIG. 4 illustrates a backside view of the interface shown in FIG. 2.

FIGS. 3 and 4 illustrate side views of the control button interface. Referring to FIG. 3, the control buttons 201–203 are included along with supports 301–304 along with 4 pins 305–308, provide stability to the control button interface as well as ensure that there is enough space between the buttons. In this way, supports 301–304 isolate the buttons from one another. Note that control buttons 201–203 are flush with the surface of the pager. In one embodiment, the control button interface is flush with, or slightly below, the surface of the cover of the paging device so that none of the buttons is activated when the pager is laid on its face.

In one embodiment, the control button interface shown in FIGS. 2, 3 and 4 has the following dimensions in inches:

| | |
|---|---|
| A | 1.57 |
| B | 0.81 |
| C | 0.28 |
| D | 0.02 |
| E | 0.045 |
| F | 0.129 |
| G | 5 × 0.08 |

Figure 5:
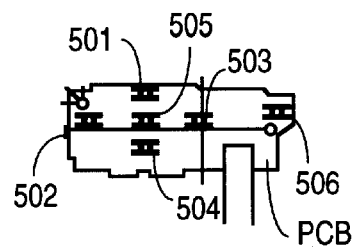
FIG. 5 illustrates one embodiment of the switch printed computer board (PCB) with switches for interaction with the interface of FIG. 2.

FIG. 5 illustrates the switches that are operable in response to the depression of the pad 210 of the control button interface. Referring to FIG. 5, a switch PCB is shown with switches 501–506. Each of these switches is positioned beneath control button location in the pad 210. It should be noted that other types of switches, such as dome switches (e.g., polymer, metal, etc.) may be used to operate in response to depression of one of the control buttons. In another embodiment, switches 501–508 may be conductive elastomer switches instead of discrete switches. In one embodiment, the conductive elastomer switches operate so that depression of a control button or control switch causes metal associated with both the control button and a switch cradle to contact each other causing a short.

Note that the switch PCB is coupled to the PCB containing the rest of the pager components in a manner well-known in the art. A discussion of these been omitted to avoid obscuring the present invention.

Figure 6:
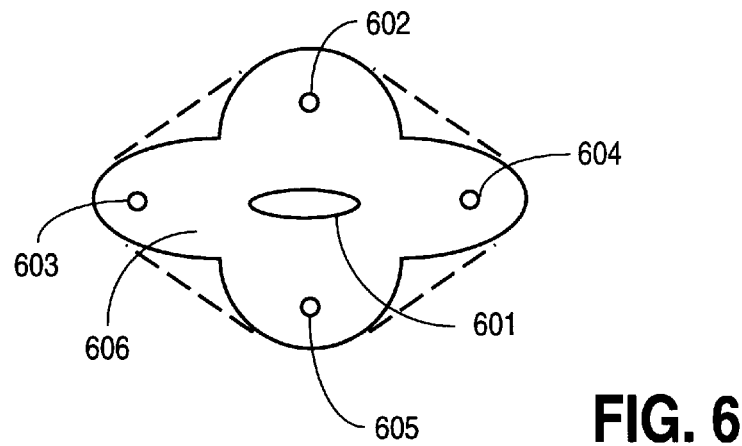
FIG. 6 illustrates an alternative embodiment of the interface of the present invention.

FIG. 6 illustrates an alternative embodiment of the control button layout, referred to as the clover leaf design. Referring to FIG. 6, each of the control buttons locations 602–605 is positioned close to or equal distance from control button 601. A single pad 606 is coupled to each of the control button locations 601–604. However, depression of each of the control buttons does not cause another button to be depressed. In the case where the pad surface is not flexible, the control buttons don't interfere due in part to the cutout regions illustrated by dotted lines.

Figure 7:
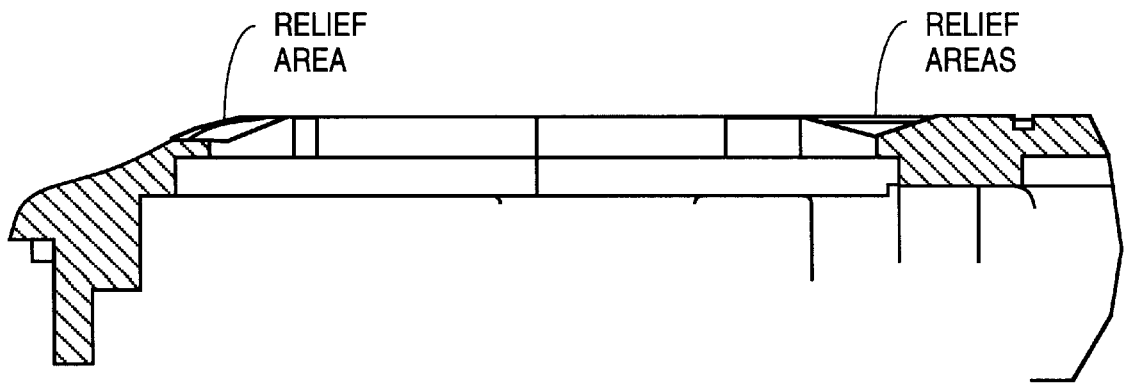
FIG. 7 illustrates the top housing of a pager illustrating the relief areas of the present invention.

FIG. 7 illustrates the top housing of a pager illustrating the relief areas of the present invention. Referring to FIG. 7, a side view of the two relief areas 701 and 702 is shown.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

Thus, a control button interface has been described.

I claim:

1. A pager comprising:

a housing with an opening having at least one recess area around a portion of the opening;

a control button interface having a plurality of buttons, wherein the control button interface is coupled to the housing so that the plurality of buttons are flush with the housing surface, and further wherein at least one of the buttons is located near at least said one recess area so as to enable the button to move a switch travel distance without causing other buttons in the plurality of buttons to be depressed.

2. The pager defined in claim 1 where in the housing comprises two recess areas positioned opposite each other across the opening.

3. The pager defined in claim 1 wherein the two of the plurality of buttons are located opposite each other by the two recess areas.

4. The pager defined in claim 1 wherein said other buttons of the plurality of buttons are covered with a single pad.

5. The pager defined in claim 4 wherein the pad comprises a flexible material.

6. The pager defined in claim 5 wherein the pad comprises rubber.

7. The pager defined in claim 4 wherein the other buttons of the plurality of buttons are covered with hard plastic.

8. The pager defined in claim 1 further comprising discrete switches coupled to the plurality of buttons.

9. The pager defined in claim 8 wherein the discrete switches comprise surface mount switches.

10. The pager defined in claim 1 further comprises dome switches coupled to the plurality of buttons.

11. The pager defined in claim 10 wherein the dome switches comprise polymer switches.

12. The pager defined in claim 11 wherein the dome switches comprise metal switches.

13. The pager defined in claim 1 further comprising elastomer switches coupled to the plurality of buttons.

14. A pager comprising:

a housing with an opening having at least one recess area around a portion of the opening;

a control button interface having a plurality of buttons, wherein the control button interface is coupled to the housing so that the plurality of buttons are flush with the housing surface, the plurality of buttons being arranged with at least one of the buttons positioned between the other buttons in the plurality of buttons, and further wherein at least one of the buttons is located near at least said one recess area so as to enable the button to move a switch travel distance without causing other buttons in the plurality of buttons to be depressed.

\* \* \* \* \*